Figure 1:
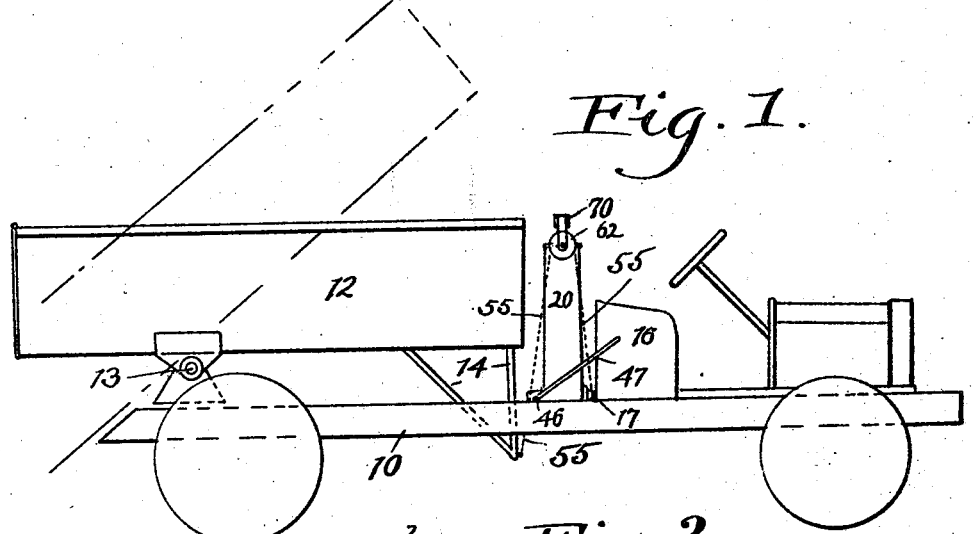

Oct. 19, 1926. 1,603,264
P. E. BARKER
DUMPING MECHANISM FOR MOTOR TRUCKS
Filed Sept. 26, 1919 2 Sheets-Sheet 1

Inventor
Percy E. Barker
By
Thurston Kwis + Hudson
attys.

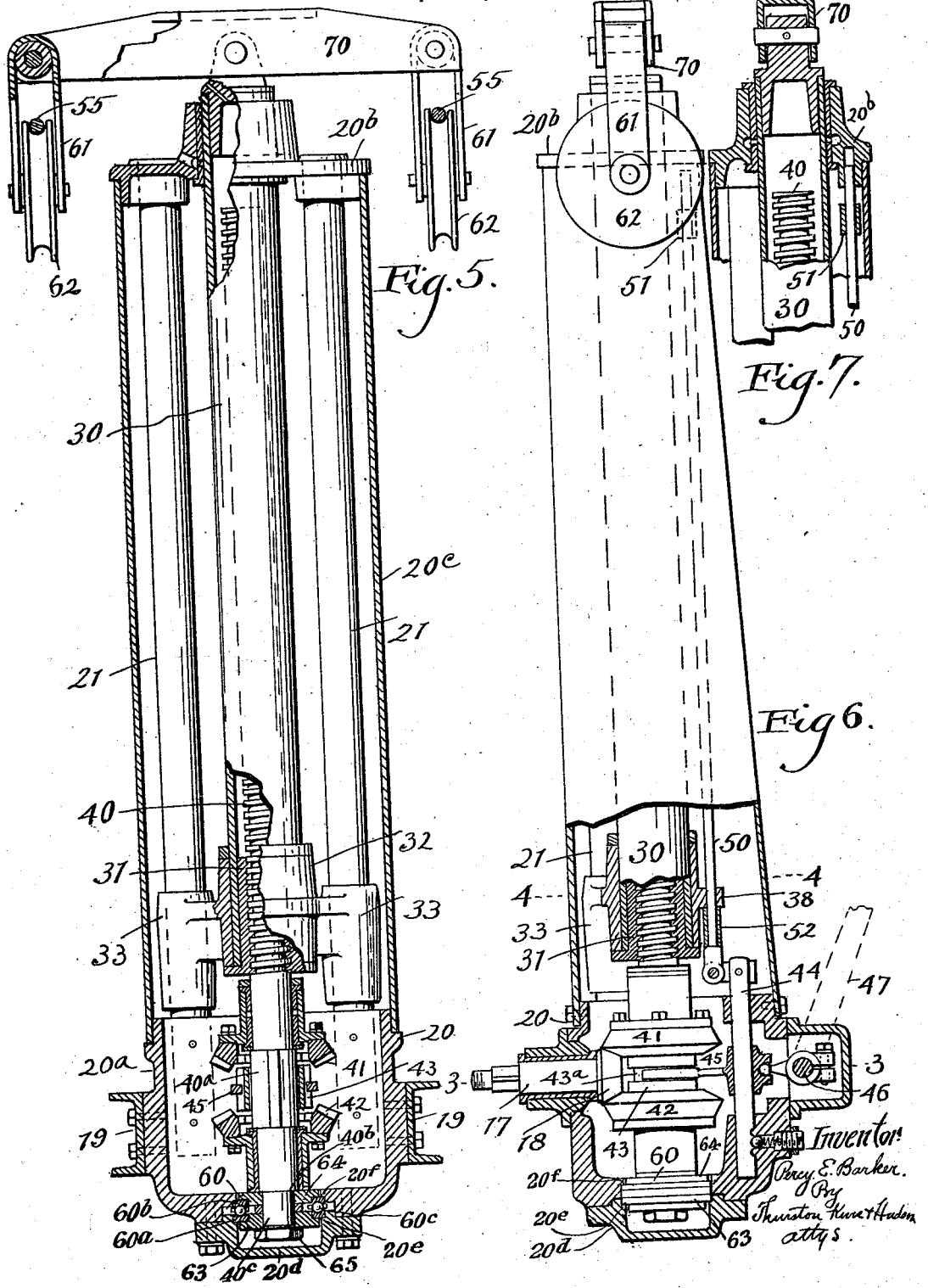

Patented Oct. 19, 1926.

1,603,264

UNITED STATES PATENT OFFICE.

PERCY E. BARKER, OF CLEVELAND, OHIO, ASSIGNOR TO THE VAN DORN IRON WORKS COMPANY, OF CLEVELAND, OHIO, A CORPORATION OF OHIO.

DUMPING MECHANISM FOR MOTOR TRUCKS.

Application filed September 26, 1919. Serial No. 326,540.

This invention relates to certain novel means by which the tilting body of a dumping motor truck may be tilted about its pivotal support and brought to the dumping position or allowed to return safely to its load carrying position; and the invention consists in the construction and combination of parts shown in the drawing, hereinafter described and pointed out definitely in the appended claims.

Figure 2:
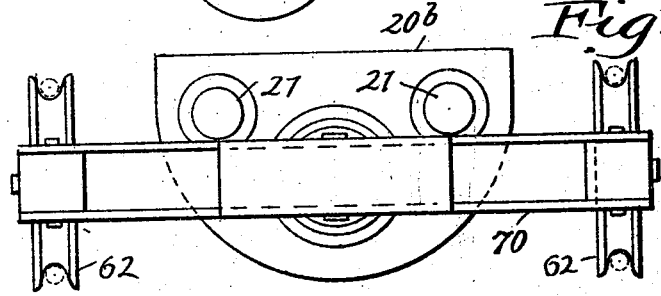
Figure 3:
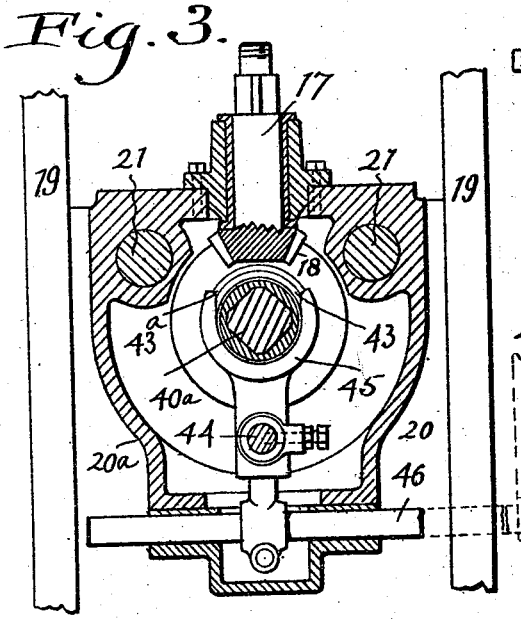
Figure 4:
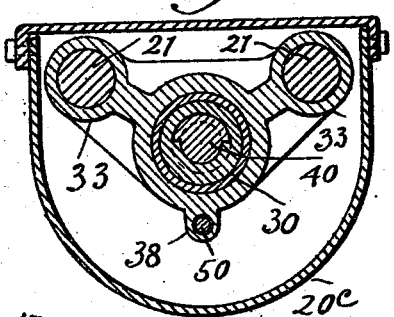

In the drawing, Fig. 1 is a side elevation of a dumping truck equipped with the present invention; Fig. 2 is a plan view of the dumping mechanism; Fig. 3 is a horizontal sectional view in the plane of line 3—3 of Fig. 6; Fig. 4 is a sectional view in the plane of line 4 on Fig. 6; Fig. 5 is a vertical sectional front elevation of the dumping mechanism; Fig. 6 is a side elevation, with the lower part thereof in central section, of said dumping mechanism, and Fig. 7 is a sectional side elevation of the upper part of said dumping mechanism.

Referring to the parts by reference characters, 10 represents the chassis frame of a motor truck; 12 represents the load carrying body which is tiltably mounted upon the chassis frame, the axis of rotation being indicated by 13. 14 represents a depending bar fixed to the front end of the body to which the body tilting cables 55 to be presently described in detail are connected in order that the body tilting mechanism may tilt the body as required.

16 represents the driver's seat, and 17 represents longitudinally extended driving shaft for the tilting mechanism. It is to be understood that this shaft has some driving connection with the same motor which is primarily provided for driving the truck; and this driving connection may be any of various forms which have been devised and used for that purpose.

The body tilting mechanism which forms the subject of the present invention is located between the front end of the body 12 and the driver's seat. The frame member 20 of this mechanism is secured to the beams 19 which are parts of the chassis frame; and it stands in a substantially upright position. This frame member is specifically in the form of a built up hollow casing in which numerous parts of the mechanism are enclosed. This casing as shown includes a base $20^a$, a top $20^b$, an intermediate tubular member $20^c$ and a cap $20^d$ which is removably connected to the lower end of the base $20^a$ thereby closing a hole through the lower end thereof. Within this frame casing are two vertical guide bars 21 which are rigidly fixed at their ends to the base and top of the casing. 30 represents a tubular plunger which is located for most part within the frame casing. It projects out through the upper end of said casing through a hole in which it is slidably mounted. In the lower end of this tubular plunger a nut 31 is fitted and secured. Around the lower end of the plunger a head 32 is fitted and secured; and this head carries two sleeves 33 which slidably embrace the two guide rods 21 respectively.

A screw 40 screws through the nut 31 and extends normally nearly to the top of the plunger which is made in tubular form. The lower end or shank of this screw is unthreaded, and has a step bearing 60 in the lower end of the frame base $20^a$. This step bearing is of the anti-friction variety and comprises a bottom ring $60^a$, an upper ring $60^b$, and a row of balls $60^c$ between these two rings in annular grooves in their opposed faces. The lower ring $60^a$ is supported upon a narrow horizontal shelf $20^e$ formed on the cap $20^d$, and the upper ring $60^b$ projects beneath a flange $20^f$ on the frame member $20^a$ and thereby the anti-friction step bearing members are prevented from moving either up or down. Upon the reduced lower end $40^c$ of the screw 40 two disks 63, 64, are fitted, the former extending under the ring $60^a$, and the latter extending over the ring $60^b$. A nut 65 which screws onto the lower end of the shaft 40 holds the two disks 63, 64, in the described position with the upper disk 64 engaging the annular shoulder 40^b on the screw, and thereby endwise movement of the screw in either direction is prevented by the engagement of these disks with the ring 60^a and 60^b, which as before stated are themselves prevented from moving lengthwise of the screw by their engagement with the base member 20^a and cap 20^d. Two bevel gears 41, 42, are respectively mounted to rotate upon the screw shank but are held against longitudinal movement thereon in any suitable mechanical way. The driving shaft 17 projects through the front wall of the base member 20^a of the casing, and is rotatably mounted therein; and it carries a bevel gear 18 on its inner end which is always in mesh with the two bevel gears 41, 42. Between these two bevel gears is a sliding clutch sleeve 43. This embraces and is slidably mounted upon the squared part 40^a of the screw shank between the two bevel gears 41, 42, which gears, and the ends of this sliding sleeve are provided with clutch jaws of well understood construction.

When the sleeve is moved up it will engage and clutch the gear 41 to the screw; when the sleeve is moved down it will engage and clutch the gear 42 to the screw.

The clutch operating mechanism shown consists of a fork arm 45 which straddles the clutch sleeve and engages in an annular groove 43^a in said sleeve. This fork arm is fixed to a vertical rod 44 which is mounted to slide vertically in suitable bearings carried by the base member 20^a. A clutch operating shaft 46 is mounted in said base member 20^a where it is capable of being rocked. It carries an arm 47 having an operative connection with rod 44 so that as the shaft is rocked this rod will be moved up or down as the case may be, whereby the clutch sleeve will be moved up or down. In order that the clutch may be released automatically at the right time, the rod 44 is fixed to another vertically slidable rod 50, to which are secured two tappet sleeves 51, 52. A tappet arm 38 is located between these two tappet sleeves for engagement therewith. This is fixed to the plunger 30. An equalizer bar 70 is pivoted to the outer end of the plunger. This equalizer bar extends transversely with respect to the truck bottom and it carries at its end respectively the straps 61 in which the two sheaves 62 are respectively mounted. Two cables 55 run over these two sheaves. Each of these cables is connected at one of its ends to the chassis frame and at its other end to the bar 14 which is fixed to the tilting body.

When it is desired to tilt the body the driving shaft 17 will be connected up with the motor through any suitable mechanism, and thereby caused to rotate. Thereupon the operator will rock the clutch operating shaft 46 so as to connect the bevel gear 42 with the screw shaft. Thereupon the screw will be turned in the direction which will cause the nut 31 to rise. Of course, the plunger 30 will go up with it and so necessarily will the equalizer bar and the sheaves which it carries, with the result that the front end of the body will be swung upward, the body turning upon its tilting axis.

When the body has been tilted to the dumping position the tappet arm 38 on the plunger will engage the tappet sleeve 51 and thereby the clutch operator will be moved up with the result of disconnecting the bevel gear 42 from the screw.

When the load has been dumped from the tilted body, the operator will rock the clutch operating shaft 46 so as to connect the bevel gear 41 with the screw shaft, and thereupon the screw shaft will turn in the reverse direction causing the nut and the plunger to move downward. As they so move the front end of the tilting body, actuated by gravity, will swing down to its normal position. As it reaches this position the tappet arm 38 will engage the tappet sleeve 52 and move the clutch sleeve 43 downward, thereby automatically disconnecting the screw from the source of power.

Having described my invention, I claim:—

1. The combination with a chassis frame of a motor truck and a tiltable body mounted thereon, of a rigid frame member fixed to the chassis frame, a vertically movable plunger, a plurality of spaced fixed guides for the plunger adapted to hold said plunger against rotation; a rotatable screw having a bearing in said frame member, a nut upon said screw fixed to said plunger, means through which the plunger tilts the body, two bevel gears rotatably mounted upon the unthreaded part of the screw, a driving shaft carrying a bevel gear constantly meshing with both of the first mentioned bevel gears, and clutch mechanism for connecting the screw with either of the bevel gears thereon.

2. In combination with a chassis frame of a motor truck, a tiltable body mounted thereon, a rigid frame member fixed to said chassis, two spaced vertical guide bars, a vertical screw which at its lower end has a bearing upon said frame member, a tubular plunger into which said screw projects, a guide for the upper end of said plunger, a nut fitted upon the screw and secured in the lower end of said plunger, a head which embraces and is fixed to the lower end of said plunger and is provided with guide sleeves which respectively embrace the two guide rods, means for rotating the screw in either direction, and means operated by the plunger for tilting the body.

3. The combination with a chassis frame of a motor truck and a tiltable body mounted thereon, of a casing frame fixed to said chassis frame, a tubular vertically movable nonrotatable plunger having slidable engagement through the upper end of said casing frame and being spaced from said frame throughout its main extent, a nut fixed in the lower end of said tubular plunger, a screw fitted into said nut and projecting into said plunger and having a step bearing on the casing frame below said plunger, means through which the plunger tilts the body, a pair of bevel gears rotatably mounted upon the unthreaded shank of said screw, a driving shaft rotatably mounted in the casing frame, a pinion fixed thereto in mesh with both of the first mentioned bevel gears, and clutch mechanism for connecting either of said bevel gears with the screw.

4. In combination with a chassis frame of a motor truck, a tiltable body mounted thereon, a rigid frame member fixed to said chassis, two spaced vertical guide bars, a vertical screw which at its lower end has a bearing upon said frame member, a tubular plunger into which said screw projects, said plunger and guide bars being arranged angularly with respect to each other, a guide for the upper end of said plunger, a nut fitted upon the screw and secured in the lower end of said plunger, a head which embraces and is fixed to the lower end of said plunger and is provided with guide sleeves which respectively embrace the two guide rods, means for rotating the screw in either direction, and means operated by the plunger for tilting the body.

5. The combination with a chassis frame of a motor truck and a tiltable body mounted thereon, of a casing frame fixed to said chassis frame, a tubular vertically movable nonrotatable plunger which is slidable through the upper end of said casing frame, a nut fixed in the lower end of said tubular plunger, a screw fitted into said nut and projecting into said plunger and having a bearing on the casing frame below said plunger, means through which the plunger tilts the body, a pair of bevel gears rotatably mounted upon the unthreaded shank of said screw, a driving shaft rotatably mounted in the casing frame, a pinion fixed thereto in mesh with both of the first mentioned bevel gears, and clutch mechanism for connecting either of said bevel gears with the screw, which clutch includes a sliding sleeve, a clutch operator engaging said sliding sleeve, a sliding rod connected with said clutch operator, two tappet sleeves fixed to said rod, and a tappet arm carried by the plunger projecting between said tappet sleeves in position to engage with either.

6. The combination with the chassis frame of a motor truck and a tiltable body mounted thereon of a rigid frame member secured to said chassis frame, a vertically movable plunger, means for guiding said plunger and holding it against rotation, a rotatable screw having an upper threaded portion and a lower unthreaded portion, said screw having a stepped bearing for mounting the same against longitudinal movement in said frame member, a nut upon said screw and fixed to said plunger, means through which said plunger tilts said body, upper and lower bevel gears rotatably mounted upon the unthreaded portion of the screw, a driving shaft having a bevel gear constantly meshing with said upper and lower gears, a vertically movable clutch member interposed between said upper and lower gears and adapted to connect either of said gears to said screw, a clutch shifter having a manually operable lever connected thereto, and a vertically extending rod connected to said shifter having spaced tappets thereon engageable by a part of said plunger to shift said clutch to neutral position upon a predetermined movement of the plunger in either direction.

7. The combination with the chassis frame of a motor truck and a tiltable body mounted thereon, of a vertical housing having a base portion fixed to said frame, a tubular body portion and a cap at the upper end thereof, vertical rods in said housing rigidly connecting said cap and base, a plunger in said housing and extending through the cap thereof, guide members fixed to said plunger and slidable upon said rods, a screw having a stepped bearing for maintaining the same fixed against longitudinal movement in said base portion and having an unthreaded portion above said bearing, a nut on said screw fixed to said plunger, upper and lower bevel gears rotatable upon the unthreaded portion of the screw, a drive shaft journaled in the housing and carrying a bevel gear constantly meshing with said upper and lower gears, a clutch sleeve nonrotatably secured to said screw and slidable thereon between said gears, a manually operated lever outside said housing connected with said sleeve for actuating the same, a vertical rod connected to said sleeve and having a sliding connection with a part of said plunger, and spaced tappets on said rod engageable with said part to shift said sleeve to neutral position at the upper and lower limits of movement of said plunger and to hold said sleeve against movement by said lever in one direction when said part is in engagement with either of the tappets, and means whereby said plunger tilts said body.

8. The combination with the chassis frame of a motor truck and a tiltable body mounted thereon, of a rigid casing secured to said chassis frame, a longitudinally movable plunger, a rotatable screw having bearing in said casing, a nut upon said screw and fixed to said plunger, means through which said plunger tilts said body, a drive shaft, means including a clutch for effecting driving connection between said shaft and screw in either direction so as to raise or lower said truck body, a clutch shifter having a manually operable lever connected thereto, and a rod connected to said shifter, and being provided with spaced tappets engageable by a part of said plunger to shift said clutch to neutral position upon a predetermined movement of the plunger in either direction, said tappets being located entirely within said casing.

In testimony whereof, I hereunto affix my signature.

PERCY E. BARKER.